United States Patent
Dickhans et al.

(10) Patent No.: US 9,775,369 B2
(45) Date of Patent: Oct. 3, 2017

(54) FIRE BRAISING PROCESS FOR MEAT

(71) Applicant: HORMEL FOODS CORPORATION, Austin, MN (US)

(72) Inventors: Thomas W. J. Dickhans, Austin, MN (US); Christopher C. Candullo, Owatonna, MN (US); Vern J. Noland, Browerville, MN (US); Joel D. Reiman, Austin, MN (US)

(73) Assignee: HORMEL FOODS CORPORATION, Austin, MN (US)

( * ) Notice: Subject to any disclaimer, the term of this patent is extended or adjusted under 35 U.S.C. 154(b) by 666 days.

(21) Appl. No.: 13/797,087

(22) Filed: Mar. 12, 2013

(65) Prior Publication Data
US 2014/0272058 A1    Sep. 18, 2014

(51) Int. Cl.
| | |
|---|---|
| *A23L 1/01* | (2006.01) |
| *A23B 4/06* | (2006.01) |
| *A23L 5/10* | (2016.01) |
| *A23L 13/00* | (2016.01) |
| *A23L 13/50* | (2016.01) |
| *A23L 13/70* | (2016.01) |

(52) U.S. Cl.
CPC *A23L 1/01* (2013.01); *A23B 4/06* (2013.01); *A23L 5/10* (2016.08); *A23L 13/00* (2016.08); *A23L 13/50* (2016.08); *A23L 13/76* (2016.08)

(58) Field of Classification Search
CPC ........ A23L 1/01; A23L 1/0121; A23L 1/0135; A47J 37/044
USPC ................. 426/510, 523, 231, 520
See application file for complete search history.

(56) References Cited

U.S. PATENT DOCUMENTS

| | | |
|---|---|---|
| 4,081,564 A | 3/1978 | Borsuk |
| 4,737,373 A | 4/1988 | Forney |
| (Continued) | | |

FOREIGN PATENT DOCUMENTS

| | | |
|---|---|---|
| DE | 3036331 A1 | 5/1982 |
| DE | 202005000079 U1 | 9/2005 |
| (Continued) | | |

OTHER PUBLICATIONS http://footage.shutterstock.com/clip-2784043-stock-footage-flat-bread-on-electric-grill-conveyor-goes-into-the-machine-slowly.html (This is a video. Please visit this web address to view the video.).

(Continued)

*Primary Examiner* — Michele L Jacobson
*Assistant Examiner* — Preston Smith
(74) *Attorney, Agent, or Firm* — Dicke, Billig & Czaja, PLLC

(57) ABSTRACT

A fire searing process for meat comprises cooking meat in an oven and then at least crust-freezing the meat in a freezer. The oven has a temperature of at least 1500° F., and the meat is cooked in the oven for approximately 10 seconds to 3 minutes. The meat is cooked to a depth of approximately 0.25 to 25% of the meat extending into an inner surface of the meat from an outer surface of the meat to form a crust-like portion proximate the outer surface of the meat. The meat is then at least crust-frozen in a freezer having a temperature of approximately −35 to 0° F. for approximately 1 to 6 minutes. The freezer prevents the meat from being further cooked to preserve the crust-like portion proximate the outer surface of the meat.

16 Claims, 2 Drawing Sheets

Flame Sear

Quick Chill

Optional Slow Cook

(56) References Cited

U.S. PATENT DOCUMENTS

| | | |
|---|---|---|
| 4,753,216 A | 6/1988 | Nolte |
| 4,873,107 A | 10/1989 | Archer |
| 5,415,883 A * | 5/1995 | Leu .............................. 426/293 |
| 5,780,085 A * | 7/1998 | Ruzek ........................... 426/281 |
| 5,931,084 A | 8/1999 | Blanga |
| 5,942,142 A | 8/1999 | Forney et al. |
| 5,951,895 A | 9/1999 | Green et al. |
| 5,974,956 A | 11/1999 | McConnell |
| 6,248,381 B1 * | 6/2001 | Liberman et al. ............ 426/240 |
| 6,743,454 B1 * | 6/2004 | Gibson et al. ................ 426/243 |
| 7,325,483 B2 | 2/2008 | Szymanski |
| 2002/0033100 A1 | 3/2002 | Sada et al. |
| 2007/0131215 A1 | 6/2007 | McVeagh et al. |
| 2009/0181138 A1 | 7/2009 | Howard |

FOREIGN PATENT DOCUMENTS

| | | |
|---|---|---|
| DE | 102010000329 A1 | 9/2011 |
| JP | 11-318717 | 11/1999 |
| JP | 2000-342458 | 12/2000 |
| WO | 96/09766 A1 | 4/1996 |
| WO | 00/38527 A1 | 7/2000 |
| WO | 2006/047968 A2 | 5/2006 |
| WO | 2012/171076 A1 | 12/2012 |

OTHER PUBLICATIONS

"Double D Searer/Grill Marker", JBT FoodTech, http://www.jbtfoodtech.com, 2 pages, printed Mar. 7, 2013.

"Double D Steam Cooker", JBT FoodTech, http://www.jbtfoodtech.com, 2 pages, printed Mar. 7, 2013.

"Fast, food-focused and cost-effective", JBT FoodTech, http://www.jbtfoodtech.com, 4 pages, printed Mar. 7, 2013.

* cited by examiner

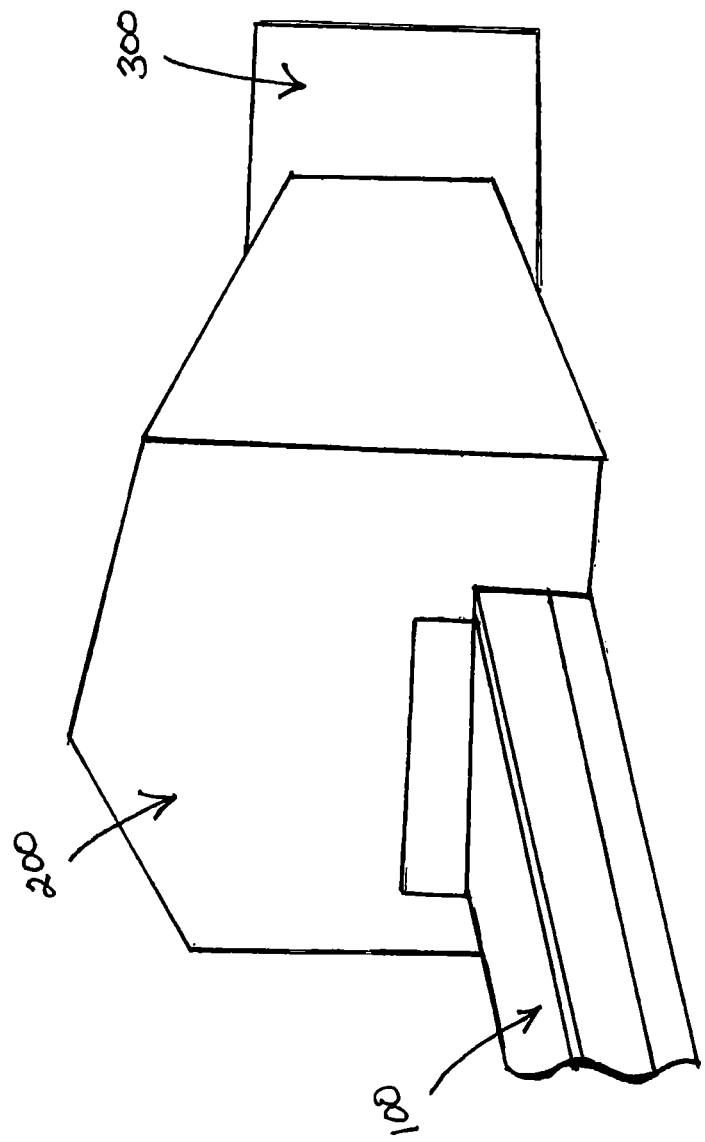

FIRE BRAISING PROCESS FOR MEAT

BACKGROUND OF THE INVENTION

A problem to be solved is how to braise (flame sear and then slow cook) meat on a mass scale without internally partially to substantially or fully cooking the meat during the flame searing process. It is desired to obtain a braised meat product that does not have a deep cook ring or is partially to substantially or fully cooked after the flame searing process and before the slow cooking process.

For the reasons stated above and for other reasons stated below, which will become apparent to those skilled in the art upon reading and understanding the present specification, there is a need in the art for an improved fire braising process.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, a fire searing process for meat comprises cooking meat in an oven and then at least crust-freezing the meat in a freezer. The oven has a temperature of at least 1500° F., and the meat is cooked in the oven for approximately 10 seconds to 3 minutes. The meat is cooked to a depth of approximately 0.25 to 25% of the meat extending into an inner surface of the meat from an outer surface of the meat to form a crust-like portion proximate the outer surface of the meat. The meat is then at least crust-frozen in a freezer having a temperature of approximately −35 to 0° F. for approximately 1 to 6 minutes. The freezer prevents the meat from being further cooked to preserve the crust-like portion proximate the outer surface of the meat.

In one embodiment, a fire braising process comprises cooking meat in a first oven, at least crust-freezing the meat, and then slowly cooking the meat in a second oven. The first oven has a temperature of at least 1500° F., and the meat is cooked in the first oven for approximately 10 seconds to 3 minutes. The meat is cooked to a depth of approximately 0.25 to 25% of the meat extending into an inner surface of the meat from an outer surface of the meat to form a crust-like portion proximate the outer surface of the meat. The meat is then at least crust-frozen in a freezer having a temperature of approximately −35 to 0° F. for approximately 1 to 6 minutes. The freezer prevents the meat from being further cooked to preserve the crust-like portion proximate the outer surface of the meat. The meat is then slowly cooked in the second oven having a temperature of approximately 140 to 195° F. for approximately 0.25 to 20 hours.

BRIEF DESCRIPTION OF THE DRAWINGS

The present invention can be more easily understood, and further advantages and uses thereof can be more readily apparent, when considered in view of the detailed description and the following Figures in which:

FIG. 2 is a schematic view of an example of a type of equipment for use with the present invention.

In accordance with common practice, the various described features are not drawn to scale but are drawn to emphasize specific features relevant to the present invention. Reference characters denote like elements throughout the Figures and the text.

DETAILED DESCRIPTION OF THE INVENTION

Figure 1:
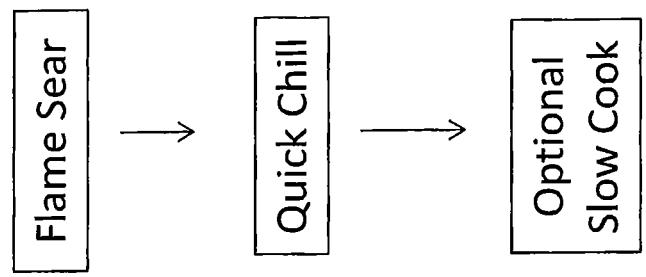
FIG. 1 is a flow chart of an embodiment in accordance with the principles of the present invention.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

The term "cook", and other forms thereof, means to subject food to the application of heat. The cooking process may or may not result in fully cooked food. Therefore, the term "cook" does not mean that the food is fully cooked.

Embodiments of the present invention provide a fire braising process for meat products such as, but not limited to, beef, poultry, seafood, wild game, and pork.

In one embodiment, raw meat is moved through an oven on a conveyor belt. Any suitable type of oven may be used. An example of a suitable oven that could be used is a 7M BTU searing unit with flames on both the top and the bottom of the unit and optionally a conveyor belt moving through the unit. This example oven preferably includes 8 burners, 4 burners on the top and 4 burners on the bottom. The burners are raised or lowered and angled so that the whole outer surface of the meat is relatively evenly browned. The height and angles of the burners depend upon the type, the cut, the size, the thickness, etc. of the meat. For example, for chicken, the burners are preferably angled inward toward the center of the oven and, for ribs, the burners are preferably angled straight up and down. Another example of a suitable oven that could be used is the Double D Searer/Grill Marker, optionally combined with the Double D Continuous Oven, manufactured by JBT FoodTech.

The temperature inside the oven is approximately at least 1500° F. The meat is in the oven for a time period sufficient to form a crust-like portion proximate the outer surface of the meat, approximately 10 seconds to 3 minutes, but again, this depends upon the type, the cut, the size, the thickness, etc. of the meat. The time the meat is in the oven is controlled by the speed of the conveyor belt. The meat is fully cooked to a depth of approximately 0.25 to 25% of the meat extending into an inner surface of the meat from an outer surface of the meat to form a crust-like portion proximate the outer surface of the meat. For example, if the meat is 2 inches thick, the meat would include a fully cooked portion having a depth of no more than ¼ inch from an outer surface of the meat into an inner surface of the meat to form a crust-like portion proximate the perimeter or outer surface of the meat. After flame searing, the meat could have an internal temperature as high as 100° F. and an external temperature as high as 400° F. Char-marks could be made on the meat, if desired, in the oven by using a bar-marking cylinder that is raised and lowered according to the thickness of the meat, and the bar-marking cylinder is heated by the burners in the oven.

After the flame searing process, the meat is moved via the conveyor belt through a freezer, which quickly chills the meat to stop the cooking process and prevent the meat from being further cooked to preserve the crust-like portion proximate the outer surface of the meat. This is a rapid, active cooling process. Preferably, an impingement freezer is used. The temperature in the impingement freezer is approximately −35 to 0° F. The meat is in the impingement freezer for approximately 1 to 6 minutes, depending upon the type, the cut, the size, the thickness, etc. of the meat. At least the temperature of the meat proximate the outer surface of the meat, a depth of approximately 0.25 to 25% of the meat extending into an inner surface of the meat from an outer surface of the meat, is lowered to below 40° F. Because the cooking process is stopped, a deep cook ring of no more than 25% of the meat's perimeter thickness is not formed in the meat. Although it is recognized that the meat could be partially or completely frozen, preferably, the meat is crust-frozen in the impingement freezer. Crust-frozen means no more than 25% of the meat's perimeter thickness is lowered to below 40° F. An example of a suitable impingement freezer that could be used is the Frigoscandia ADVAN-TEC™ Impingement Freezer manufactured by JBT Food-Tech. Optionally, this impingement freezer could be combined with the Double D Searer/Grill Marker and the Double D Continuous Oven, all manufactured by JBT FoodTech, to provide in-line processing.

After the rapid, active cooling process, the meat is either packaged or slow cooked in a steam oven to create a braised product. If the meat is packaged, the meat is later cooked, preferably in a steam oven, to create a braised product. The meat is slowly cooked in the steam oven at approximately 140 to 195° F. for approximately 0.25 to 20 hours depending upon the type, the cut, the size, and thickness, etc. of the meat. An example of a suitable steam oven that could be used is the Double D Steam Cooker manufactured by JBT FoodTech.

As shown in FIG. 1, in one embodiment, the meat is first flame seared, then quickly chilled, and optionally slow cooked before it is packaged. Other options include slow cooking the flame seared, chilled meat after it has been packaged or packaging the flame seared, chilled meat and then selling it in a raw and frozen state for the end user to complete the cooking.

As shown in FIG. 2, in one embodiment, a conveyor belt 100 moves the meat through an oven 200 and then into a freezer 300.

This process flame sears meat without internally cooking the meat during the flame searing process. The meat is not internally cooked because there is not a deep cook ring or the meat is not fully cooked. Because the cooking process is stopped using a freezer, a deep cooking ring does not form in the meat and, in addition, the flavor and the texture of the meat is not degraded. Rather, a crust-like portion, not a deep cooking ring, is formed proximate the outer surface of the meat. A deep cooking ring is defined as a ring around the perimeter of the meat that is fully cooked that does not exceed 25% of the thickness of the meat. Meat is fully cooked when it meets the industry and government standard for thermal processing rendering the meat acceptable for consumption. The crust-like portion is a cooked portion having a depth of approximately 0.25 to 25% extending into an inner surface of the meat from the outer surface of the meat. Because the crust-like portion is relatively shallow, it does not form a deep cooking ring.

EXAMPLE 1

Five burners were positioned at desired positions, heights, and angles. The searing unit was turned on, the temperature within the searing unit reached at least 1500° F., and a large piece of pork was placed on the searing unit's conveyor belt, which was set to run at approximately 15 feet per minute. The exit conveyor belt was set to run at approximately 16 feet per minute. After searing, the pork ran through an impingement freezer on a conveyor belt at approximately 4 feet per minute, and the temperature within the impingement freezer was set at −32° F. In the impingement freezer, the internal temperature of the pork reached the target of 40° F. or below.

The pork was then either packaged or slow cooked. For the pork that was slow cooked, the cooking temperature of the oven was set at 190° F. When the internal temperature of the pork reached approximately 185° F., the pork was cooked for an additional 45 minutes in the oven to create braised pork. The braised pork was then placed in a blast cooler and then allowed to cool in accordance with USDA guidelines. The braised pork was then packaged.

EXAMPLE 2

Four burners were positioned at desired positions, heights, and angles. The searing unit was turned on, the temperature within the searing unit reached at least 1500° F., and ribs were placed on the searing unit's conveyor belt, which was set to run at approximately 11 feet per minute. The exit conveyor belt was set to run at approximately 15 feet per minute. After searing, the ribs ran through an impingement freezer on a conveyor belt at approximately 5 feet per minute, and the temperature within the impingement freezer was set at −32° F. In the impingement freezer, the internal temperature of the ribs reached the target of 40° F. or below.

The ribs were then either packaged or slow cooked. For the ribs that were slow cooked, the cooking temperature of the oven was set at 190° F. When the internal temperature of the ribs reached approximately 185° F., the ribs were cooked for an additional 1 hour in the oven to create braised ribs. The braised ribs were then placed in a blast cooler and then allowed to cool in accordance with USDA guidelines. The braised ribs were then packaged.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:
1. A fire searing process for meat, comprising:
cooking meat in an oven having a temperature of at least 1500° F. for approximately 10 seconds to 3 minutes, the meat being cooked to a depth of approximately 0.25 to 25% of the meat extending into an inner surface of the meat from an outer surface of the meat to form a crust-like portion proximate the outer surface of the meat; and
crust-freezing the meat to a depth of approximately 0.25 to 25% of the meat extending into an inner surface of the meat from an outer surface of the meat in a freezer having a temperature of approximately −35 to 0° F. for approximately 1 to 6 minutes, the crust-freezing preventing the meat from being further cooked to preserve the crust-like portion proximate the outer surface of the meat and to prevent a deep cook ring from forming.

2. The process of claim 1, wherein the meat is from the group consisting of beef, poultry, seafood, wild game, and pork.

3. The process of claim 1, wherein the outer surface of the meat is seared.

4. The process of claim 1, wherein the meat is cooked in the oven by moving the meat through the oven on a conveyor belt.

5. The process of claim 4, wherein a rate at which the conveyor belt moves through the oven controls a time period the meat is cooked in the oven.

6. The process of claim 1, further comprising packaging the meat after the freezing step.

7. The process of claim 1, further comprising slowly cooking the meat after the freezing step to obtain a braised product.

8. The process of claim 7, wherein the meat is slowly cooked in a steam oven having a temperature of approximately 140 to 195° F. for approximately 0.25 to 20 hours.

9. A fire braising process, comprising:
cooking meat in a first oven having a temperature of at least 1500° F. for approximately 10 seconds to 3 minutes, the meat being cooked to a depth of approximately 0.25 to 25% of the meat extending into an inner surface of the meat from an outer surface of the meat to form a crust-like portion proximate the outer surface of the meat;

crust-freezing the meat to a depth of approximately 0.25 to 25% of the meat extending into an inner surface of the meat from an outer surface of the meat in a freezer having a temperature of approximately −35 to 0° F. for approximately 1 to 6 minutes, the crust-freezing preventing the meat from being further cooked to preserve the crust-like portion proximate the outer surface of the meat and to prevent a deep cook ring from forming; and then slowly cooking the meat in a second oven having a temperature of approximately 140 to 195° F. for approximately 0.25 to 20 hours.

10. The process of claim 9, wherein the meat is from the group consisting of beef, poultry, seafood, wild game, and pork.

11. The process of claim 9, wherein the outer surface of the meat is seared in the first oven.

12. The process of claim 9, wherein the meat is cooked in the first oven by moving the meat through the oven on a conveyor belt.

13. The process of claim 12, wherein a rate at which the conveyor belt moves through the first oven controls a time period the meat is cooked in the first oven.

14. The process of claim 9, wherein the second oven is a steam oven.

15. The process of claim 1, wherein the meat is a piece of raw meat.

16. The process of claim 9, wherein the meat is a piece of raw meat.

* * * * *